United States Patent
Vaughan et al.

(10) Patent No.: US 9,701,414 B2
(45) Date of Patent: Jul. 11, 2017

(54) AIRCRAFT ENGINE COWL DOOR MOVEMENT CONTROL SYSTEM AND METHOD

(71) Applicant: HONEYWELL INTERNATIONAL INC., Morristown, NJ (US)

(72) Inventors: Ron Vaughan, Gilbert, AZ (US); Leroy Allen Fizer, Huntington Beach, CA (US); James Wawrzynek, Phoenix, AZ (US); Kevin K. Chakkera, Chandler, AZ (US); Mohamed A. Salam, Torrance, CA (US); William Warr, Glendale, CA (US); Stephen Birn, Long Beach, CA (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 924 days.

(21) Appl. No.: 14/063,247

(22) Filed: Oct. 25, 2013

(65) Prior Publication Data

US 2015/0078879 A1    Mar. 19, 2015

Related U.S. Application Data

(60) Provisional application No. 61/878,194, filed on Sep. 16, 2013.

(51) Int. Cl.
*B64D 29/06* (2006.01)
*B64D 27/00* (2006.01)

(52) U.S. Cl.
CPC ................... *B64D 29/06* (2013.01)

(58) Field of Classification Search
CPC ................ B64D 27/00; B64D 29/06
USPC ............ 415/1; 244/53 B, 54, 129.4; 248/554
See application file for complete search history.

(56) References Cited

U.S. PATENT DOCUMENTS

| | | | | |
|---|---|---|---|---|
| 4,297,844 A * | 11/1981 | Halin | .............. | F02K 1/76 417/324 |
| 4,656,407 A * | 4/1987 | Burney | ................ | B60K 31/042 123/352 |
| 5,327,055 A * | 7/1994 | Danielson | ................. | H02P 3/04 318/366 |
| 5,960,626 A * | 10/1999 | Baudu | .............. | F02K 1/76 244/110 B |
| 6,094,908 A * | 8/2000 | Baudu | .............. | F02K 1/70 244/110 B |
| 6,622,963 B1 | 9/2003 | Ahrendt et al. | | |
| 8,256,311 B2 * | 9/2012 | Payne | .............. | B64C 1/14 74/89.23 |

(Continued)

FOREIGN PATENT DOCUMENTS

DE   102006032747 A1   1/2008
WO   2009024654 A1   2/2009

*Primary Examiner* — Sean J Younger
(74) *Attorney, Agent, or Firm* — Lorenz & Kopf, LLP

(57) ABSTRACT

A system and method are provided for controlling the movement of an aircraft engine cowl door between an open position and a closed position. The system includes an electric motor, at least one actuator, and an electrically operated brake. The actuator is coupled to the motor and is operable to move the cowl door between the closed and the open position. The electrically operated brake is coupled to the electric motor and the at least one actuator and is configured, upon being energized, to supply a unidirectional resisting torque load to the electric motor that does not prevent motor rotation.

13 Claims, 2 Drawing Sheets

(56) References Cited

U.S. PATENT DOCUMENTS

| | | | | |
|---|---|---|---|---|
| 8,684,305 B2* | 4/2014 | Pereira | ............... | B64D 29/08 |
| | | | | 244/53 R |
| 8,686,589 B2* | 4/2014 | Pereira | ............... | B64D 29/08 |
| | | | | 307/115 |
| 8,939,401 B2* | 1/2015 | Pereira | ............... | F02K 1/763 |
| | | | | 239/265.29 |
| 2006/0150613 A1 | 7/2006 | Kruegel et al. | | |
| 2011/0297516 A1* | 12/2011 | Murali | ............... | H01H 3/16 |
| | | | | 200/47 |
| 2012/0125191 A1 | 5/2012 | Moradell-Casellas et al. | | |
| 2013/0078081 A1* | 3/2013 | Chakkera | ............... | F02K 1/64 |
| | | | | 415/150 |

* cited by examiner

--PRIOR ART--

AIRCRAFT ENGINE COWL DOOR MOVEMENT CONTROL SYSTEM AND METHOD

CROSS-REFERENCE TO RELATED APPLICATION

This application claims the benefit of U.S. Provisional Application No. 61/878,194, filed Sep. 16, 2013.

TECHNICAL FIELD

The present invention generally relates to aircraft engines, and more particularly relates to an aircraft engine cowl door movement control system and method.

BACKGROUND

The engines installed on many aircraft are housed within a nacelle. Typically, the engine nacelle includes one or more cowl doors that are moveable between open and closed positions. In the open position, the cowl doors allow maintenance personnel to access the interior of the nacelle to repair and maintain the engine.

The movement of the cowl doors between the open and closed positions is accomplished via hydraulic, pneumatic, or electric actuation systems. Hydraulic systems may include one or more hydraulic controllers and hydraulic lines coupled to the aircraft's hydraulic system, and hydraulic actuators connected to the doors. Pneumatic systems may include one or more controllers coupled to one or more pneumatic motors that are coupled to the cowl doors via actuators. Similarly, electric systems may include one or more controllers coupled to one or more electric motors that are coupled to the cowl doors via actuators.

Although presently known hydraulic, pneumatic, and electric cowl door actuation systems are generally satisfactory, each can suffer certain drawbacks. For example, known hydraulic and pneumatic controls can be complex, bulky, and heavy. Whereas known electric systems, while being relatively less bulky and heavy, may allow the cowl doors, due to their own weight, to abruptly impact engine or actuator structure when moving to the closed position.

Hence, there is a need for an improved system and method to control the movement of aircraft engine cowl doors that is safe, simple, reliable, less expensive, light in weight, and will not allow abrupt impact when moving to the closed position. The present invention addresses one or more of these needs.

BRIEF SUMMARY

In one embodiment, a system for controlling movement of an aircraft engine cowl door between an open position and a closed position includes an electric motor, at least one actuator, and an electrically operated brake. The actuator is coupled to the motor and is operable to move the cowl door between the closed and the open position. The electrically operated brake is coupled to the electric motor and at least one actuator and is configured, upon being energized, to supply a resisting torque load to the electric motor that does not prevent motor rotation.

In another embodiment, a system for controlling movement of an aircraft engine cowl door between an open position and a closed position includes an electric motor, at least one actuator, a first electrically operated brake, a second electrically operated brake, and a controller. At least one actuator is coupled to the motor and is operable to move the cowl door between the closed and the open position. The first electrically operated brake is coupled to the electric motor and is configured to selectively supply a braking torque to the motor that prevents motor rotation. The second electrically operated brake is coupled to the electric motor and at least one actuator and is configured, upon being energized, to supply a resisting torque load to the electric motor that does not prevent motor rotation. The controller is coupled to the electric motor, the first electrically operated brake, and the second electrically operated brake. The controller is configured to controllably energize the electric motor, controllably energize the first electrically operated brake, and controllably energize the second electrically operated brake.

In yet another embodiment, a method for controlling movement of a cowl door from an open position to a closed position in a system that includes an electric motor coupled to the cowl door includes the steps of controllably energizing the electric motor to thereby rotate the motor in a direction that moves the cowl door toward the closed position, and simultaneously energizing an electrically operated brake to thereby supply a resisting torque load to the electric motor that does not prevent motor rotation.

Furthermore, other desirable features and characteristics of the aircraft engine cowl door movement system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
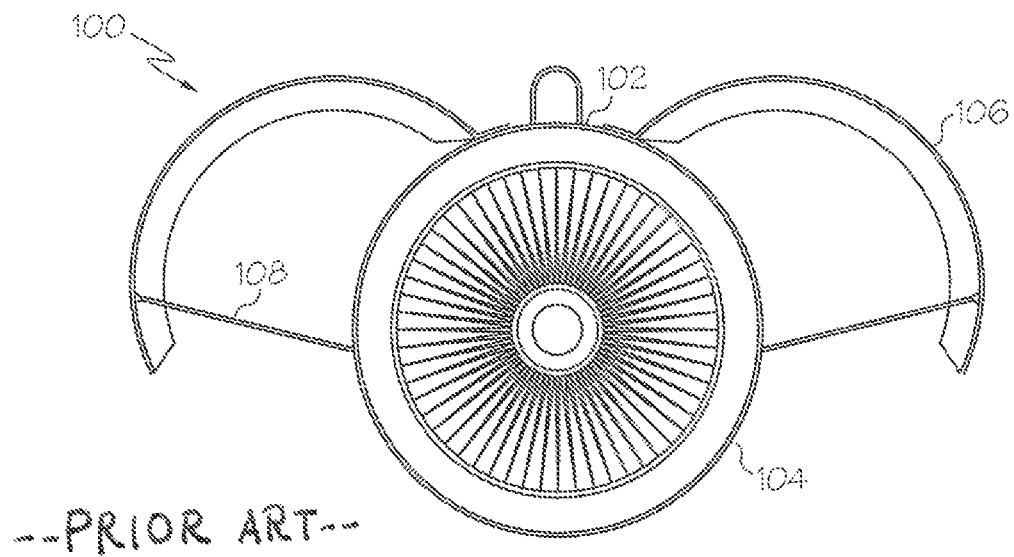
FIG. 1 depicts a front view of a jet engine with at least one set of cowl doors open.

An engine 100, such as the gas turbine engine depicted in FIG. 1, includes at least a fan section and a turbine section that are housed within an engine nacelle 102. The nacelle 102 includes one or more sets of cowl doors that may be opened to provide access to various portions of the engine.

For example, the nacelle 102 may include fan cowl doors 104 (shown in the closed position), one on each side of the engine nacelle 102, that may be opened to provide access to the engine fan section, and thrust reverser cowl doors 106 (shown in the opened position), one on each side of the engine nacelle 102, that may be opened to provide access to the turbine engine section. It will be appreciated that the jet engine 100, depending upon its configuration, may include more or less cowl doors than explicitly depicted and described. As FIG. 1 additionally depicts, one or more holding tubes 108 may be mounted on the inner portion of the cowl doors 104 and 106 to assist in holding the cowl doors 104 and 106 open.

Figure 2:
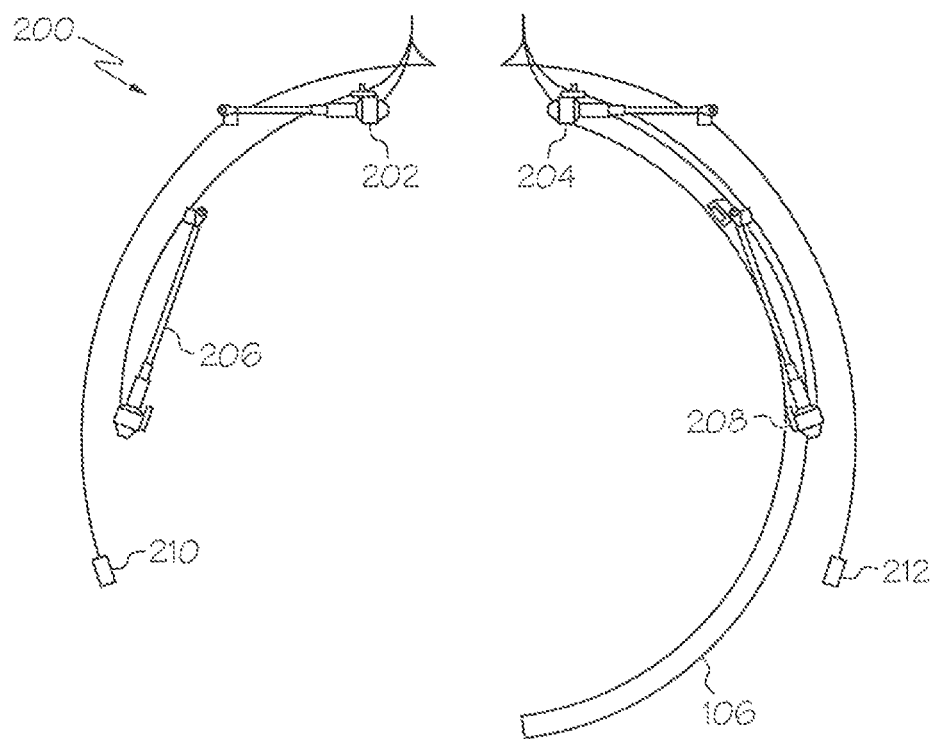
FIG. 2 is a schematic representation of an exemplary embodiment of a cowl door control system that depicts one physical arrangement of actuator assemblies within an engine nacelle.

The cowl doors 104 and 106 are each moved between the open and close positions using a cowl door operating control system 200. A schematic representation of one exemplary embodiment of the control system 200 is depicted in FIG. 2. The depicted control system 200 includes a plurality of actuator assemblies and one or more controllers. In the depicted embodiment, the control system 200 includes first and second fan cowl door actuators 202 and 204, and first and second thrust reverser cowl door actuators 206 and 208. The first 202 and second 204 fan cowl door actuators are each coupled to one of the fan cowl doors 102 and, likewise, the first 206 and second 208 thrust reverser cowl door actuators are each coupled to one of the thrust reverser cowl doors 104. For the sake of clarity, only a single thrust reverser cowl door 106 is depicted in FIG. 2.

In the depicted embodiment, a first cowl door operating controller 210 is electrically coupled to the first fan cowl door actuator 202 and to the first thrust reverser cowl door actuator 206, and a second cowl door operating controller 212 is electrically coupled to the second fan cowl door actuator 204 and to the second thrust reverser cowl door actuator 208. As will be discussed below, the first 210 and second 212 controllers control the movement of the actuators 202-208, thereby controlling the movement of the cowl doors 104 and 106.

In a preferred embodiment, each controller 210 and 212 is operable to separately control the movement of each of the actuator assemblies to which it is coupled. It will be appreciated, however, that the controllers 210 and 212 could be configured to simultaneously control the movement of each actuator assembly. It will be further appreciated that although the depicted control system 200 includes two controllers 214 and 216, one for the doors on each side of the engine 100, the control system 200 could also be configured with individual controllers for each actuator assembly, or as a single controller that controls the movement of the actuator assemblies individually or collectively.

Figure 3:
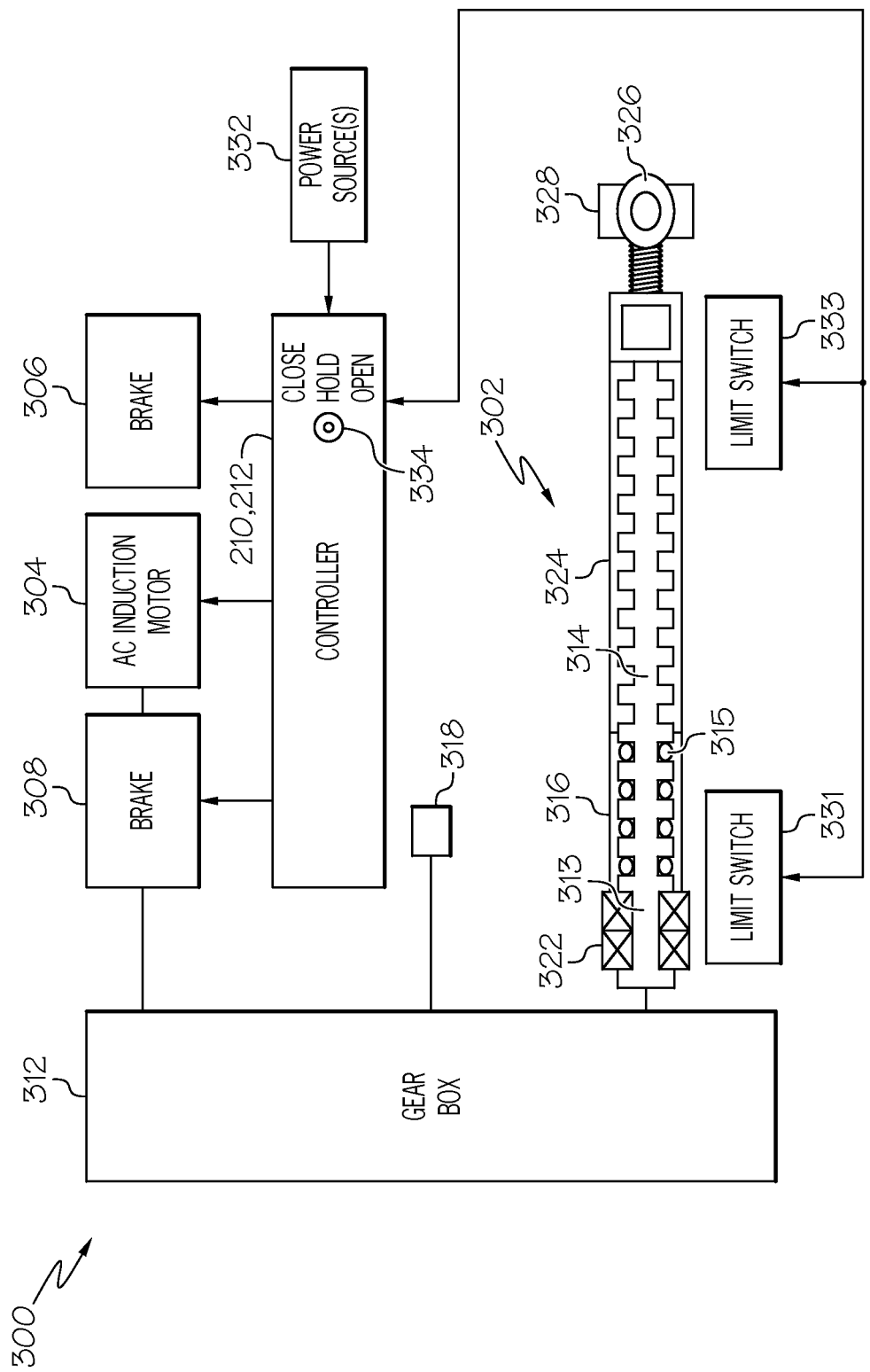
FIG. 3 is a functional block diagram representation of an actuator assembly that may be used to move the cowl doors depicted in FIG. 1.

Turning now to FIG. 3, a schematic representation of one embodiment of an actuator assembly 300 that may be used as either a fan cowl door actuator 202 and 204 or an thrust reverser cowl door actuator 206 and 208 will be described. The depicted actuator assembly 300 includes an actuator 302, an electric motor 304, a first electrically operated brake 306, and a second electrically operated brake 308. In the depicted embodiment, the actuator 302 includes a gear box 312, a ball screw shaft 314, and a ball nut 316. The gear box 312 houses non-illustrated reduction gears and mechanically couples the motor 304 to the ball screw shaft 314. Though not depicted, the gear box 312 may also house a torque limiter that is mechanically coupled between motor 304 and the reduction gears. The torque limiter may be, for example, a ball ramp type torque limiting clutch that limits the output force below the actuator load limit should a jam occur at any position along the stroke of the actuator assembly 300. The torque limiter may also inhibit potential damage during manual operation of the actuator assembly 300. Manual operation may be carried out via a manual drive 318 that is coupled directly to the gear box 312. This configuration allows the actuator 302 to be manually operated via the gear box 312.

The ball screw shaft 314 is rotationally mounted by a duplex bearing assembly 322 positioned proximate a first end 313 of the ball screw shaft 314. The ball nut 316 is rotationally supported on the ball screw shaft 314 by a plurality of ball bearings 315 and is coupled, for example, via an extension tube 324 and spherical bearing 326, to one of the cowl doors (not illustrated in FIG. 3). An anti-rotation tab 328 prevents the ball nut 316 and extension tube 324 from rotating. Thus, rotation of the electric motor 304 causes rotation of the ball screw shaft 314, which results in translation of the ball nut 316 and extension tube, and movement of the attached cowl door. It will be appreciated that although the actuators 300 depicted and described herein are ball screw type actuators, the depicted embodiment could use other types of actuator designs such as, for example, jack screw actuators and roller screw actuators.

The motor 304 is coupled to the actuator 302 via the second electrically operated brake 308 and the gear box 312. The motor 304 is preferably an AC induction motor, though various other AC or DC motor designs may be used. Regardless of the particular type of motor that is used, it is controllably energized, via one of the controllers 210 or 212, to rotate and generate a torque in a direction that will cause the actuator 302 to move the cowl door 104, 106 to which it is coupled between the closed and open positions.

The first electrically operated brake 306 is preferably coupled to the motor 304 and may be any one of numerous known brake designs known in the art such as, for example, an electromagnetic (EM) brake. No matter the particular design, the electrically operated brake assembly 306 is preferably operable to apply a braking force to the motor 304 when power is removed from the first electrically operated brake 306, and to remove the braking force from the motor 304 when power is supplied to the first electrically operated brake 306. Thus, when the first electrically operated brake 306 is de-energized, it substantially prevents rotation of the motor 304, and when the first electrically operated brake 306 is energized, it allows the motor 304 to rotate freely. It will be appreciated that the actuator assembly 300 may be configured such that the motor 304 and first electrically operated brake 306 are offset from, but in the same plane as, the actuator 302, or the actuator assembly 300 may be configured such that the motor 304 and first electrically operated brake 306 are in line with the actuator 302 and perpendicular with the actuator, respectively. It will additionally be appreciated that in each of the described embodiments the motor 304 could be directly coupled to the actuator 302 without any intervening gears.

The second electrically operated brake 308 is coupled to the motor 304 to receive the torque generated thereby. The second electrically operated brake 308 is additionally coupled to the actuator 302 via the reduction gears 312, and thus transfers the torque generated by the motor 304 to the actuator 302. The second electrically operated brake 308 is further coupled to one of the controllers 210 or 212. The controller 210, 212 to which the second electrically operated brake 308 is coupled is configured to controllably energize the second electrically operated brake 308. The second electrically operated brake 308 may be variously implemented. For example, the second electrically operated brake 308 may be implemented as a magnetic particle brake, or a friction disk brake, just to name two non-limiting examples. In a particular embodiment, however, the second electrically operated brake 308 is implemented as a hysteresis brake. As is generally known, a hysteresis brake 308, when electrically energized, will generate a resisting torque load that is proportional to the magnitude of the current supplied thereto. Conversely, when the hysteresis brake 308 is de-energized, it is free to rotate.

As FIG. 3 additionally depicts, the actuator assembly 300 may additionally be implemented with a plurality of limit switches. The limit switches may include one or more close limit switches 331 and one or more open limit switches 333. The limit switches 331, 333 are coupled to the actuator assembly 302 and are in operable communication with one of the controllers 210, 212. The limit switches 331, 333 may be implemented using any one of numerous types of switch devices, which include various types of mechanically, electrically, magnetically, and optically operated switches, just to name a few. The one or more close limit switches 331 are configured to supply a signal to the appropriate controller 210 or 212 when the actuator assembly 302 is in the fully retracted position. Similarly, the one or more open limit switches 333 are configured to supply a signal to the appropriate controller 210 or 212 when the actuator assembly 302 is in the fully extended position.

The cowl door operating controllers 210 and 212 are each electrically coupled to one of the motors 304, one of the electrically operated brakes 306, and one of the second electrically operated brakes 308. Each controller 210 and 212 is also electrically coupled to a receive power from one or more power sources 332 (only one depicted), and includes at least a cowl position control switch 334. The one or more power sources 332 may be part of the electrical system of the aircraft or a ground power source, such as a ground cart.

The cowl position control switch 334 may be variously configured, but in the depicted embodiment it is a multi-position switch, preferably having at least three positions such as, for example, OPEN, HOLD, and CLOSE positions. In the OPEN position, the position control switch 334 electrically couples both the motor 304 and the first electrically operated brake 306 to the one or more power sources 332, and electrically isolates the second electrically operated brake 308. As a result, the first electrically operated brake 306 releases, and the motor 304 freely rotates in the direction to open the cowl doors 104 and 106. The motor 304 will continue to rotate in the open direction until the position control switch 334 is moved to the HOLD position, the CLOSE position, or until the cowl door 102, 104 reaches its full open position, as indicated by the one or more open limit switches 333.

In the HOLD position, the position control switch 334 electrically isolates the one or more power sources 332 from the motor 304, the first electrically operated brake 306, and the second electrically operated brake 308. This causes the motor 304 to stop rotating in the open direction (if it was rotating in that direction) and the first electrically operated brake 306 to engage. As a result, the cowl doors 104 and 106 are held in place by the brake assembly 306. For additional holding power, the holding tubes 108 may be extended into position, as indicated in FIG. 1 above. It will be appreciated that other mechanisms may also be used to hold the cowl doors in the open position.

In the CLOSE position, the position control switch 334 electrically couples the one or more power sources 332 to all three of the motor 304, the first electrically operated brake 306, and the second electrically operated brake 308. This causes the first electrically operated brake 306 to release, the motor 304 to rotate in the direction to close the cowl doors 104 and 106, and the second electrically operated brake 308 to supply a unidirectional torque load to the motor 304. As noted above, the torque load supplied to the motor 304 is proportional to the magnitude of the current supplied to the second electrically operated brake 308. Preferably, the magnitude of the current supplied to the second electrically operated brake 308 is such that the torque load supplied to the motor 304 matches the weight of the cowl door 104, 106 that the motor 304 is closing. It will thus be appreciated that in the CLOSE position the cowl doors 104 and 106 are driven toward the close position both by the motor 304 and the force of their own weight. However, the second electrically operated brake 308 provides a resisting torque to counter the load from the weight of the cowl doors 104 and 106. The motor 304 will continue to rotate in the close direction until the position control switch 334 is moved to the HOLD position, the OPEN position, or until the cowl door 102, 104 reaches its full closed position, as indicated by the one or more close limit switches 331.

It should be noted that during manual operation torque is applied via the manual drive 318 while the first electrically operated brake 306 is de-energized. Thus, a resisting brake torque is always provided to prevent the cowl doors 104 and 106 from being uncontrollably driven by their own weight when or if manual operation torque is decreased or removed. This also avoids the need of a manual brake release mechanism.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for controlling movement of an aircraft engine cowl door between an open position and a closed position, comprising:
    an electric motor configured, upon being energized, to generate a torque;
    at least one actuator coupled to the motor and operable to move the cowl door between the closed and the open position;
    an electrically operated brake coupled between the electric motor and the at least one actuator to thereby transfer the torque generated by the electric motor to the actuator, the electrically operated brake configured, upon being energized, to supply a resisting torque load to the electric motor that does not prevent motor rotation;
    a power source configured to supply electric power; and
    a controller coupled to the power source, to the electric motor, and to the electrically operated brake, the controller including a cowl position control switch and configured to (i) controllably energize the electric motor and (ii) controllably energize the electrically operated brake,
    wherein:
        the cowl position control switch has an OPEN position, a CLOSE position, and a HOLD position,
        in the OPEN position, the cowl position control switch electrically couples the motor to the power source and electrically isolates the electrically operated brake from the power source;
        in the CLOSE position, the cowl position control switch electrically couples both the motor and the electrically operated brake to the power source; and
        in the HOLD position, the cowl position control switch electrically isolates both the motor and the electrically operated brake from the power source.

2. The system of claim 1, further comprising:
a second electrically operated brake coupled to the electric motor and configured to selectively supply a braking torque to the motor that prevents motor rotation.

3. The system of claim 1, wherein the actuator comprises:
a rotationally mounted ball screw shaft, the ball screw shaft coupled to receive torque supplied by the electric motor and configured, upon receipt thereof, to rotate; and
a ball nut rotationally supported on the ball screw shaft, the ball nut configured to translate in response to rotation of the ball screw shaft.

4. The system of claim 1 wherein:
the controller is further configured to controllably supply current to the electrically operated brake, the current having a current magnitude; and
the electrically operated brake is configured, upon receipt of the current, to supply the resisting torque load at a magnitude that is proportional to the current magnitude.

5. The system of claim 1, further comprising:
an open limit switch disposed at least proximate the actuator, the open limit switch configured to sense when the actuator is in a fully extended position and, in response thereto, to supply a signal representative thereof; and
a close limit switch disposed at least proximate the actuator, the close limit switch configured to sense when the actuator is in a fully retracted position and, in response thereto, to supply a signal representative thereof.

6. The system of claim 1, wherein the electrically operated brake comprises a hysteresis brake.

7. The system of claim 1, further comprising:
a gear box coupled between the electrically operated brake and the at least one actuator; and
a manual drive coupled to the gear box.

8. A system for controlling movement of an aircraft engine cowl door between an open position and a closed position, comprising:
- an electric motor configured, upon being energized, to generate a torque;
- at least one actuator coupled to the motor and operable to move the cowl door between the closed and the open position;
- a first electrically operated brake coupled to the electric motor and configured to selectively supply a braking torque to the motor that prevents motor rotation;
- a second electrically operated brake coupled between the electric motor and the at least one actuator to thereby transfer the torque generated by the electric motor to the actuator, the second electrically operated brake configured, upon being energized, to supply a resisting torque load to the electric motor that does not prevent motor rotation;
- a power source configured to supply electric power;
- a controller coupled to the power source, to the electric motor, to the first electrically operated brake, and to the second electrically operated brake, the controller including a cowl position control switch having an OPEN position, a CLOSE position, and a HOLD position, the controller configured to:
  - controllably energize the electric motor,
  - controllably energize the first electrically operated brake, and
  - controllably energize the second electrically operated brake, wherein:
- in the OPEN position, the cowl position control switch electrically couples both the motor and the first electrically operated brake to the power source, and electrically isolates the second electrically operated brake from the power source,
- in the CLOSE position, the cowl position control switch electrically couples both the motor and the second electrically operated brake to the power source, and electrically isolates the first electrically operated brake from the power source, and
- in the HOLD position, the cowl position control switch electrically isolates the motor, the first electrically operated brake, and the second electrically operated brake from the power source.

9. The system of claim 8, wherein:
the controller is further configured to controllably supply current to the second electrically operated brake, the current having a current magnitude; and
the second electrically operated brake is configured, upon receipt of the current, to supply the resisting torque load at a magnitude that is proportional to the current magnitude.

10. The system of claim 8, further comprising:
- an open limit switch disposed at least proximate the actuator, the open limit switch configured to sense when the actuator is in a fully extended position and, in response thereto, to supply a signal representative thereof; and
- a close limit switch disposed at least proximate the actuator, the close limit switch configured to sense when the actuator is in a fully retracted position and, in response thereto, to supply a signal representative thereof.

11. The system of claim 8, wherein the actuator comprises:
- a rotationally mounted ball screw shaft, the ball screw shaft coupled to receive torque supplied by the electric motor and configured, upon receipt thereof, to rotate; and
- a ball nut rotationally supported on the ball screw shaft, the ball nut configured to translate in response to rotation of the ball screw shaft.

12. The system of claim 8, wherein the second electrically operated brake comprises a hysteresis brake.

13. The system of claim 8 further comprising:
- a gear box coupled between the electrically operated brake and the at least one actuator; and
- a manual drive coupled to the gear box.

* * * * *